(12) United States Patent
Loew

(10) Patent No.: US 9,137,294 B2
(45) Date of Patent: Sep. 15, 2015

(54) METHOD, SYSTEM, AND APPARATUS FOR FUTURE DELIVERY OF DIGITAL CONTENT OVER A NETWORK

(75) Inventor: Jonathan B. Loew, Merrick, NY (US)

(73) Assignee: KeepTree, Inc., New York, NY (US)

( * ) Notice: Subject to any disclaimer, the term of this patent is extended or adjusted under 35 U.S.C. 154(b) by 237 days.

(21) Appl. No.: 13/301,438

(22) Filed: Nov. 21, 2011

(65) Prior Publication Data

US 2013/0046810 A1 Feb. 21, 2013

Related U.S. Application Data

(60) Provisional application No. 61/525,230, filed on Aug. 19, 2011, provisional application No. 61/545,951, filed on Oct. 11, 2011.

(51) Int. Cl.
*G06F 15/16* (2006.01)
*H04L 29/08* (2006.01)

(52) U.S. Cl.
CPC ............. *H04L 67/06* (2013.01); *H04L 67/26* (2013.01); *H04L 67/2857* (2013.01); *H04L 67/325* (2013.01)

(58) Field of Classification Search
USPC ........................................................ 709/203
See application file for complete search history.

(56) References Cited

U.S. PATENT DOCUMENTS

| | | | |
|---|---|---|---|
| 2005/0193078 A1* | 9/2005 | Jordan | 709/206 |
| 2005/0273514 A1 | 12/2005 | Milkey et al. | |
| 2007/0203911 A1 | 8/2007 | Chiu | |
| 2009/0047981 A1 | 2/2009 | Khanna | |
| 2009/0156181 A1* | 6/2009 | Athsani et al. | 455/414.2 |
| 2010/0211575 A1* | 8/2010 | Collins et al. | 707/749 |
| 2011/0202615 A1* | 8/2011 | Fletcher | 709/206 |

FOREIGN PATENT DOCUMENTS

| | | |
|---|---|---|
| JP | 2001-282684 | 10/2001 |
| JP | 2004-007077 | 1/2004 |
| JP | 2004-046402 | 2/2004 |
| JP | 2007-213547 | 8/2007 |
| WO | WO 02/45445 | 6/2002 |

OTHER PUBLICATIONS

International Search Report for International Application No. PCT/US2012/051360 mailed Sep. 25, 2012.
Office Action issued by the Japanese Patent Office for Application No. 2012-129130 dated Jul. 30, 2013.

* cited by examiner

*Primary Examiner* — Tauqir Hussain
(74) *Attorney, Agent, or Firm* — Pearl Cohen Zedek Latzer Baratz LLP

(57) ABSTRACT

According to embodiments of the invention, there are provided a system and method for future delivery of digital content over a data network. Digital content may be obtained at a server over a data network from a client device or from a third party vendor server, the digital content being intended for future delivery to one or more recipients, on or after a designated delivery date. The delivery metadata may include at least one recipient and a delivery date. The digital content may be stored and inaccessible to the recipient user, until the delivery date, at which time, the content may be delivered to the at least one recipient.

13 Claims, 3 Drawing Sheets

METHOD, SYSTEM, AND APPARATUS FOR FUTURE DELIVERY OF DIGITAL CONTENT OVER A NETWORK

CROSS-REFERENCE TO RELATED APPLICATION

This application claims the benefit of U.S. Provisional Patent Application No. 61/525,230, filed on Aug. 19, 2011, and U.S. Provisional Patent Application No. 61/545,951, filed on Oct. 11, 2011, which are incorporated in their entirety herein by reference.

FIELD OF THE INVENTION

The present invention relates generally to Internet applications and social networks, and more specifically, to a system and method for archiving and future delivery of digital content over a network.

BACKGROUND OF THE INVENTION

Various Internet applications allow users to send messages and multimedia digital content. For example, users can send texts and attached files, such as video or audio files, via email, or they may post content on their own dedicated space, thereby allowing permitted users to view the content, e.g., via a social network such as Facebook®. Other methods for communicating content include instant messaging, in which users can send and receive text and other content substantially in real time. For large multimedia content files, such as video files, users may upload content onto a server, and the content is made available to users over a website, e.g., YouTube®. Some communication services allow archiving of communications for future reference, either on a server for a limited time, or on the client device. In addition, although services exist for uploading content over a network and archiving it, such services are generally directed to allowing the user (and possibly social contacts of the user) the ability to access the content at any time of the user's choosing.

SUMMARY OF EMBODIMENTS OF THE INVENTION

According to embodiments of the invention, there are provided a system and method for future delivery of digital content over a data network. Digital content may be obtained at a server over a data network from a client device or from a vendor server, the digital content being intended for future delivery to one or more recipients, on or after a designated delivery date. The delivery metadata may include at least one recipient and a delivery date. The digital content may be stored, and on the delivery date, be delivered to the at least one recipient.

According to embodiments of the invention, the stored digital content may be indexed based on delivery metadata. According to an embodiment of the invention, the digital content may be obtained by the server by interacting with a browser application operating on the client device so as to cause the client device to capture the digital content, for example, using a microphone and/or a camera. The server may cause the client device to transmit the digital content to the server. In some embodiments of the invention, the digital content may be a prerecorded file, which may be uploaded to the server. The server may play back the recorded content for approval prior to storing the content.

According to embodiments of the invention, the delivery date may be an absolute or relative date, or may be calculated based on data pertaining to another user. According to some embodiments of the invention, delivery may be performed by sending a recipient user a notification, e.g., via email or SMS text, that digital content from the recording user is available, at which time, the recipient user may log in to the server, and view or play back the digital content.

According to an embodiment of the invention, the content for future delivery may be obtained at least partially, from a third party vendor server, for example, upon purchase of the content by the sending user.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
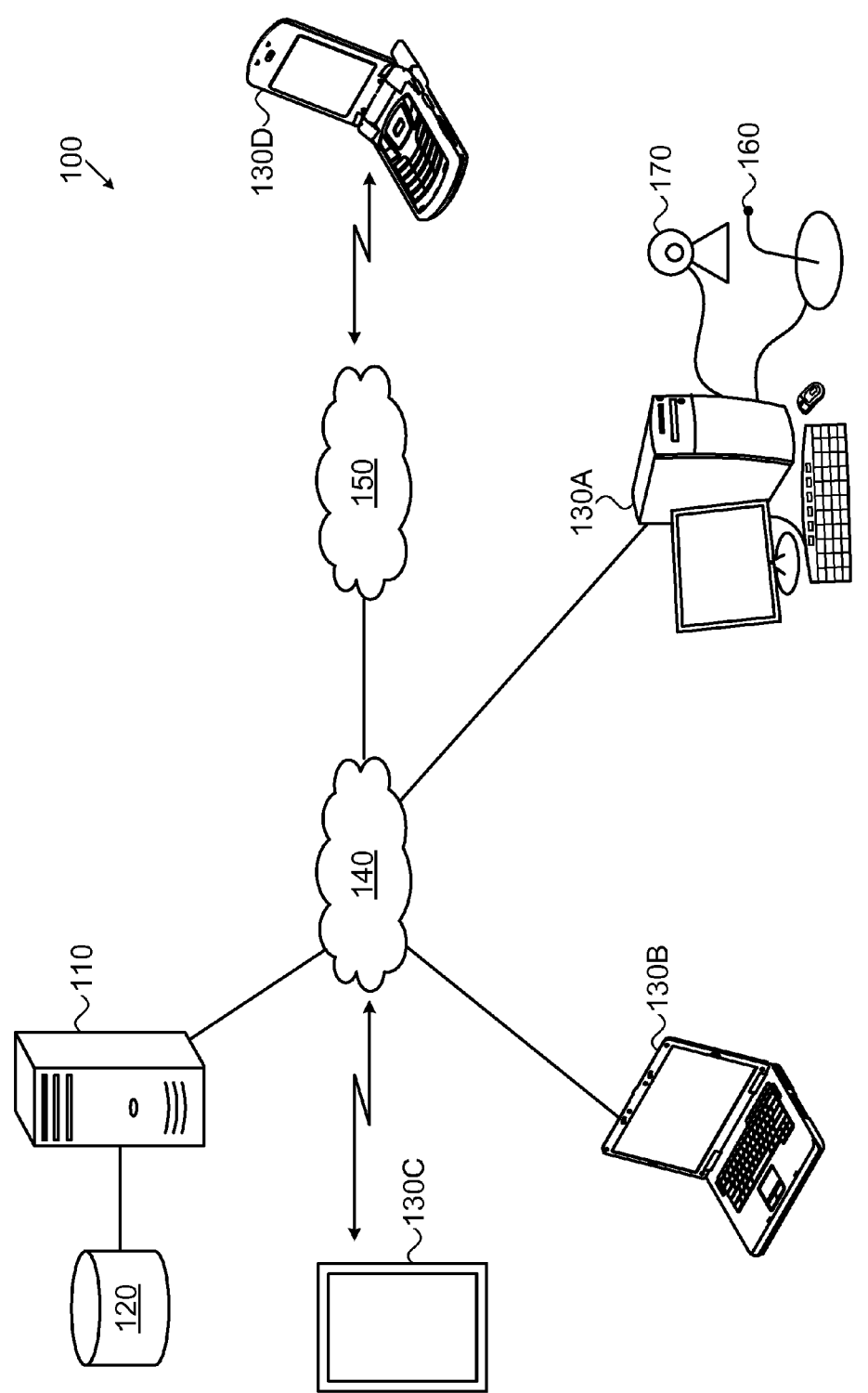
FIG. 1 shows a system including a server operating in accordance with embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality"

and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Most current video sharing/messaging systems require either software installation (e.g., Skype®) or file uploading (e.g., Youtube®) in order to be utilized. For some potential consumers, these barriers may deter them from making use of the service. Software installation, for example, may take up valuable memory and slow down a computer, while the prospect of uploading files, regardless of its actual simplicity, may deter users who are less technologically savvy. According to embodiments of the invention, there may be provided a simple content delivery system, which need not require installing software or uploading large content files, but rather, may allow users to record directly to a server over a network, eliminating at least some of the above disadvantages.

There is furthermore a need for providing a system and method for allowing archiving and scheduled delivery of content, particularly from one user to another user. According to embodiments of the invention, users may be provided with the ability to create and record multimedia messages, which may be delivered in the future (e.g., months or years later) to friends and family, or even to the general public. In accordance with some embodiments of the invention, an archiving service may be provided to store content before and after the future delivery.

According to embodiments of the invention, users, e.g., parents and grandparents, may record greeting, advice and other messages for other users, e.g., their children and grandchildren, and schedule a future delivery, e.g., at a future date, or with reference to a future event or circumstance. According to some embodiments of the invention, the sending user may have content delivered in the future by a third party vendor, as discussed further below. A user may also schedule future delivery to the user himself, for example, as an archive of digital content, or online video journal for self-use later in life. A subscription model is also provided.

FIG. 1 shows a system 100 including a server 110 operating in accordance with embodiments of the invention. The server may allow users on remote client devices to connect over a network, such as the internet, and interact with the server, and to access content stored on storage 120, associated with server 110. It will be understood that server may comprise a plurality of servers, or a cloud computing service. Storage 120 may be any suitable storage for storing multimedia content, and metadata associated therewith. It will be understood that server and/or storage may have indexing capabilities to allow rapid search and retrieval operations for multimedia content stored thereon.

Remote users may access server 110 over a data network 140 such as the internet, using any suitable client device, including desktop computer 130A, laptop computer 130B, tablet computer 130C, mobile device such as smart phone 130D, etc. Some client devices, e.g., smart phone 130D may connect via more than one network, e.g., mobile telephone network 150 and data network 140. Some client devices, e.g., as used by recording users, may include integral or peripheral recording devices, e.g., a microphone 160 and/or a camera 170. Some client devices may typically include integral or peripheral playback devices, e.g., an audio speaker.

Figure 2:
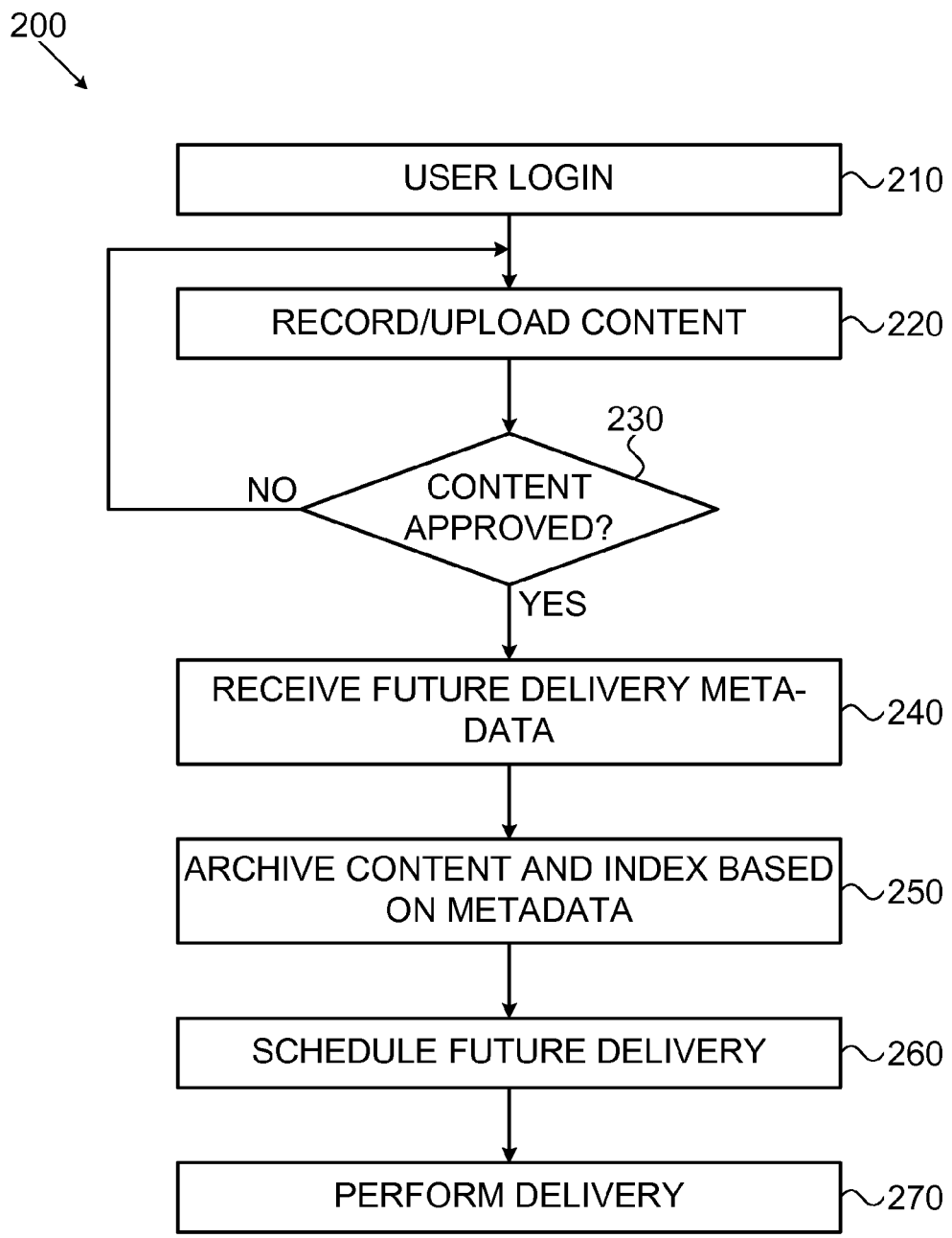
FIG. 2 shows a schematic flow diagram showing a method of delivering content according to embodiments of the invention.

FIG. 2 is a schematic flow diagram showing a method 200 of delivering content according to embodiments of the invention. A recording user may log in (210) to the server, for example, by opening a website using a browser, and when asked, providing a username and password, which may be verified by the server. Upon being authenticated, the user may be provided with a number of options, including uploading or creating content for delivery, viewing delivered content, and managing scheduled content deliveries.

If the user selects uploading or creating content for delivery, the user may proceed to record and/or upload content (220) to the server. Prior to recording, the server may query the client device to ascertain which recording devices are available, and provide recording options for those devices. For example, if only a microphone is detected, the user may be prompted to provide an audio recording; if a microphone and a camera are both detected, the user may be prompted to provide an audiovisual recording, etc.

According to embodiments of the invention, the server may provide recording users with customized settings for specific events and usages, e.g., high school graduation, birthdays, the birth of a child, long distance care packages, and regular messaging. Optionally, there may be provided on the server's website tips for various greetings. Thus, for example, if the user is recording a birthday greeting, a tip may include suggestions such as mentioning the greeting user's experiences during that birthday, or possibly advice about the particular stage of life, e.g., teenage years, etc.

When the user is ready, the user may begin recording, at which time, the audio and video inputs may be captured until the user is finished. According to some embodiments of the invention, the content may be streamed directly to the server substantially as it is being recorded by the user in real time, thereby not requiring an application to be downloaded and operated on the client device. According to other embodiments of the invention, the content may be stored temporarily or buffered on the client device and uploaded to the server when recording is complete.

When the recording is complete, the user may be provided with the option of playing back the content to determine whether the user is satisfied with the content (230). If not, the user may re-record the content. If the user is satisfied, the content may be stored and the process may proceed. It will be understood that pre-recorded content (e.g., audiovisual file, photos, text or presentation documents, or other files) may simply be uploaded as a file in similar fashion.

The user may be prompted to provide, and the server may receive, metadata pertaining to the future delivery of the recorded content (240), including, for example, recipient(s), delivery date(s), subject, occasion, and a brief description of the content.

The recording user may be asked to provide one or more recipient users to whom the content should be delivered. The recording user may indicate a single recipient, e.g., a person celebrating a birthday, or a limited group of recipients, e.g., a group of family members, a group of classmates, etc. The recording user may also indicate that the content may be made available to any user with whom the recording user is registered as having a direct connection, e.g., on a contact tree, or even any user at all registered with the system.

A recipient may be a registered user, and may be among the recording user's contacts, or non-registered user. According to an embodiment of the invention, when a recording user creates content for a user who is not among their contacts, the server may attempt to search for the recipient by name, location, mutual contacts, and other information. If the recipient is not found, the server may open a placeholder or shadow record or profile for the non-registered user, including an email and other information provided by the recording user. The server may send the prospective user/recipient an email invitation to join the service and register to open a profile. In addition, when the recording user has completed recording the content, the server may send the prospective user/recipient an email notifying them that content has been recorded for them and inviting them to join the service and register to open a profile. If the recipient creates a profile, it may take the place of the placeholder or shadow profile, and have associated with it the content previously recorded.

According to embodiments of the invention, the recording user may register connections with other users, and may indicate a degree of connection, e.g., may specify a family relationship, or may simply create groups of family, etc. Users in a family group may be indicated by the system visually for a user, e.g., by an icon next to the user's username, indicating a family member. Thus, when a recording user records content, he may be given the option of sending it to individual users, to oneself, to one's entire contact tree, to one's entire family only, or to any member of the public.

The recording user may be prompted to provide the future date on which the content is to be provided. The date may be provided as a fixed date (e.g., Jun. 12, 2020), as a relative date (e.g., the first Monday in October 2020), or as a date based on an event in the recipient user's life (e.g., nephew Oscar's $17^{th}$ birthday). Various personal dates of recipients may be known, e.g., birthday, wedding anniversary, etc. Therefore, by simply indicating the particular recipient's $17^{th}$ birthday, the server may calculate the date by reference to the recipient's profile.

Other metadata about the recorded/uploaded content may be provided, for example, there may be provided a drop-down menu of occasions, e.g., Birthday, Anniversary, Graduation, etc. There may be provided a subject field, particularly for content including musings or advice on various topics, e.g., love, marriage, etc. There may also be provided a free-form text description in which the recording user may add a comment for the receiving user to view upon receiving the message. It will be understood that the content may be recorded and the metadata entered in any order within the bounds of the invention.

The recording user may also indicate privacy/publication preferences. For example, a recording user may prefer that certain content not be forwarded, or only be forwarded to users registered in the system as family. Some content may be labeled as public, in which case, when it becomes available, any user may search and view it. Public content may be indexed and searchable based on various metadata tags, e.g., recording user's name, subject of the content, recording user's country, recording date, etc. Recording users may further designate recorded content as intended for a certain identified collection of content contributions.

When the content is finalized, and the metadata received, the server may archive and index the content (250). The server may store the content, and optionally the metadata, on a long-term archive or storage resource. According to embodiments of the invention, the content may be stored and backed up in multiple physical locations, in order to provide additional security against loss of data.

A pointer to the content may be catalogued based on various indices, e.g., recording user, recipient user, recording date, delivery date, subject, occasion, description keywords. Such indexing enables Boolean searching for content, e.g., a grandfather user's message to a granddaughter user for her $10^{th}$ birthday, messages about business advice, etc. Another index includes, for example, a public/private checkbox. Thus, there may be created a video gallery, in which content created by recording users, who have permitted the video to be made publicly available, may also be searchable. Thus, for example, a person may search for child-rearing advice from other parents, who have recorded such content for their own children over the years.

It will be understood that recording users may be allowed to manage their scheduled deliveries, for example, to remove content that may no longer be relevant, re-record content, change delivery dates, etc. According to embodiments of the invention, the recording user may opt to notify or not to notify the recipient user before the digital content is made available, e.g., at the time the recording is made and stored, or a predefined time before the delivery is made, that the recording has been made, even though the content is not yet available. For example, a recipient user may be notified that a parent has recorded a birthday greeting, and that the digital content will be made available to the recipient user as of a particular date in the future. Some metadata, e.g., the text description, may be made available prior to the delivery date.

According to embodiments of the invention, the recording user may review, revise, and re-record content to be delivered prior to delivery. In cases where the recipient user is notified of the existence of the recorded content, the recording user may opt to notify or not to notify the recipient that revisions to the recorded content have been made.

A delivery date of the content may be determined or calculated, and delivery scheduled (260). When the time and/or date for delivery of the content arrives, the content may be delivered (270) to the appropriate recipient(s). A user may configure a profile or define a preferred means of notification, e.g., email, SMS message, etc. When a content message is ready for delivery, the recipients user(s) may be notified using the respective communication channel, and be encouraged to log in and view the content. Upon logging in, the recipient user may see a new message in his/her inbox, and upon selecting the message, may be displayed the text description and play back the recorded/uploaded content. According to some embodiments of the invention, recipient users who have not logged in and viewed delivered content may be sent one or more reminders. Recording users may be notified that their content has been played back to a recipient upon delivery.

According to an embodiment of the invention, at the recording user's option, the recipient user may be notified that content has been created at the time the content is created and stored, even though the content is not yet available. For example, the recipient may be notified that content has been recorded but is "locked" until a future date, and a thumbnail, e.g., a gray or shaded icon, may appear in their inbox, but with a "lock" icon superimposed on it, with a date listed as to when it will be released.

According to some embodiments of the invention, recipients may reply to the sending user, in which case, method 200 may be repeated for the recipient user to record a message, etc. Messages may also forward content to other users, for example, if permitted by the recording user based on privacy indications in the metadata, e.g., forward allowed only to users registered as family members.

According to embodiments of the invention, a user may order an item of content to be delivered to the recipient at the future date, for example, to be accompanied by a recorded greeting. Thus, for example, a parent may order a book, movie, music, or other third party content as a birthday gift for a child's future birthday, and record a greeting for the child explaining the significance of the gift. In some embodiments of the invention, the third party content may be digital content, and may be ordered over a network from a third-party vendor, e.g., Amazon.com®.

It will be understood that the above method steps and actions taken by the server may be implemented by executing a suitable computer program including instructions to be executed by the processor of the server to perform the steps. The instructions of the computer program may be stored on a non-volatile computer-readable memory, which may be accessed, interpreted, and executed by the processor of the server to perform the steps and actions described above.

Figure 3:
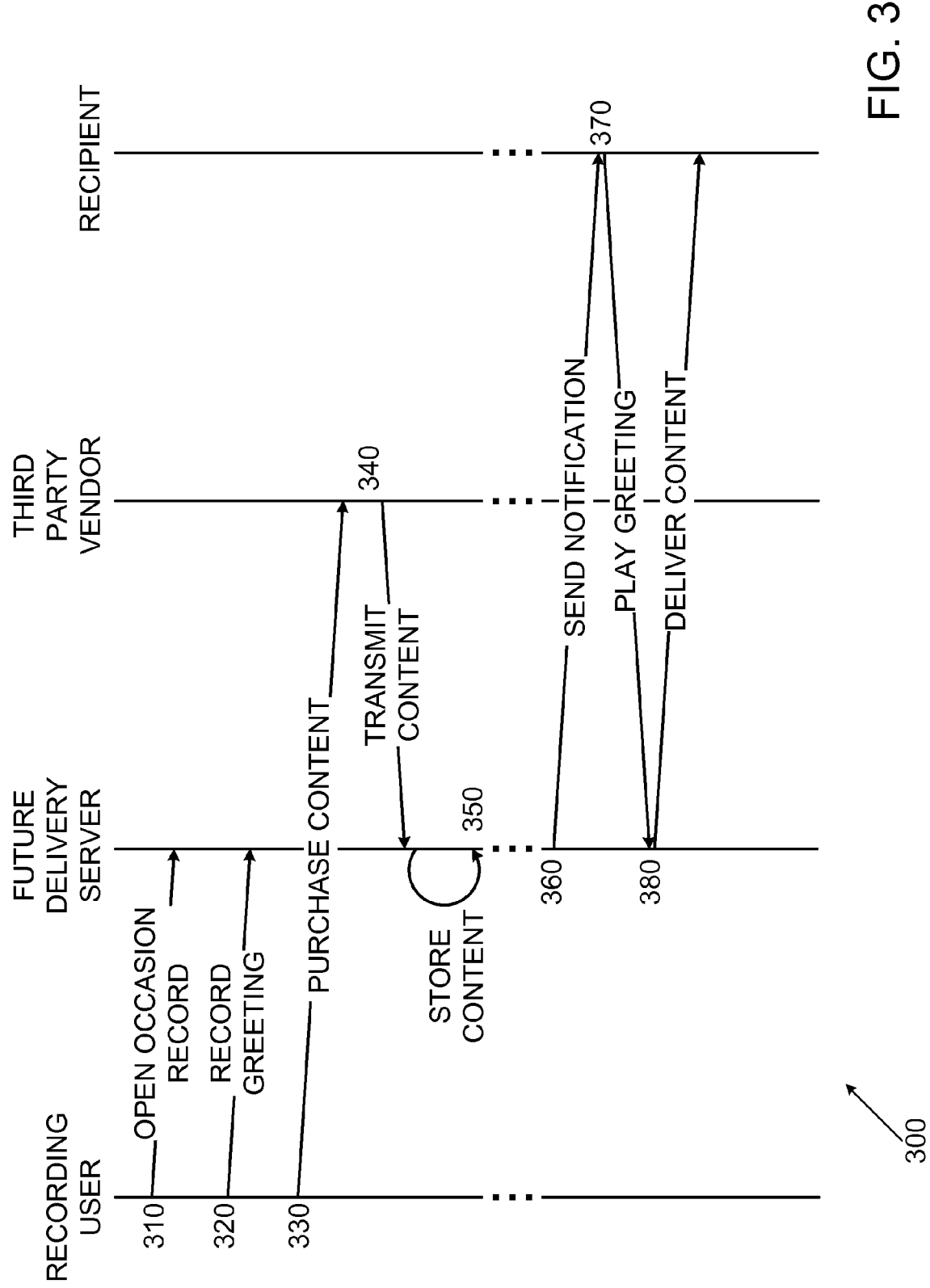
FIG. 3 shows a schematic flow diagram of interactions among the recording user, the future delivery server, the third party vendor, and a recipient, according to an embodiment of the invention.

FIG. 3 shows a schematic flow diagram 300 of interactions among the recording user, the future delivery server, the third party vendor, and a recipient, according to an embodiment of the invention. For example, a recording user, e.g., a parent, may initiate an occasion record (310) with the future delivery server for an occasion, e.g., a child's $18^{th}$ birthday. The recording user may record a greeting (320), for example, substantially as described above.

The recording user may then log into a third party vendor, either directly, or via the future delivery server, and select and purchase a gift of digital content (330), e.g., an electronic book, music files, a movie, etc. At the checkout of the transaction with the third party vendor, the recording user may have the purchased content delivered to the future delivery server (340). This interaction between the third party server and the future delivery server may transpire in any of a number of different ways. For example, in one embodiments of the invention, this may be done by providing an email address registered with the future delivery server's domain name, and upon delivery, the future delivery server may notify the recording the user and ask the recording user to identify the future occasion with which the purchase is associated. In an embodiment of the invention, the third party vendor server and the future delivery server may cooperate and communicate more closely to facilitate the future delivery. For example, the third party vendor may communicate with the future delivery server to ascertain the existence and identity of various open occasion records associated with the recording user. At checkout, the third party vendor may make available a "future gift" of "future delivery" option, in which instead of an email address or electronic device specified for delivery of the purchased content, the third party vendor may allow the purchaser to select an open occasions and associate the purchase with that occasion. The content will then be sent to the future delivery server and automatically be associated with the selected occasion.

The purchased content may be stored (350), for example, in association with other delivery data, e.g., the recorded greeting, and delivery metadata, as described above.

Upon delivery, the future delivery server may proceed substantially as described above. In an embodiment of the invention, a notification may be sent (360) that a recorded greeting has been made available, the recipient logs in and the recorded greeting is played back (370), and the stored third party content is delivered to the recipient (380).

According to embodiments of the invention, the server may provide additional functionality, for example, for various charges. For example, users may give the option of requesting that certain selected content be emailed, downloaded, or burned onto a DVD and mailed to the user.

Additional features and personalization options may further augment the above basic system and method.

According to an embodiment of the invention, the server may provide reminders to user to send greetings. For example, a predetermined time, e.g., a week, before an approaching birthday, anniversary, holiday, e.g., Christmas, may trigger a reminder to users to send out greetings. It will be understood that reminders may be sent to registered users, as well as to prospective new users based on marketing lists.

In an embodiment of the invention, the system may maintain profiles of friends, family and other individuals associated with a recording user. The server may provide a recording user with reminders and recommendations for messages based on profiles of the user's friends, family and other individuals associated with the user. Thus, for example, if a recording user is registered as associated to another user, the server may provide a reminder to the recording user that the other user's birthday is approaching. The system may further provide suggestions as to digital content to be recorded based on the type of occasion, as described above. According to some embodiments of the invention, the advance time to various occasions may be personalized for each user, based on occasion, based on individuals being greeted, etc.

According to embodiments of the invention, the server may provide recording users with customized settings for specific events and usages, e.g., high school graduation, birthdays, the birth of a child, long distance care packages, and regular messaging.

According to embodiments of the invention, there may be a membership service, such that some services are provided for free, and others are provided based on payment of a charge.

According to an embodiment of the invention, on free portions of the website, space may be sold to advertisers, which may desire to target users based on their registered profile, e.g., age, location, gender, etc. These advertisements may take the form of banner ads or short videos before or after recording content. Alternatively, or additionally, companies may sponsor fees for scheduled delivery of content and/or storage of such content, paying for the required fees. In some embodiments of the invention, an advertisement, e.g., from such a sponsor, may be shown as a banner, or played prior to or after the playback of the recorded content by the recipient.

According to an embodiment of the invention, first time users may be prompted to create a login ID and password, which may allow basic access and communication services free of charge. Thereafter, users may be charged, for example, per gigabyte of storage space, for the storage of digital content being stored for future delivery. According to an embodiment of the invention, storage periods shorter than a threshold period before the delivery date, e.g., one year, may be free of charge, but storage for periods longer than that threshold period before the delivery date may incur storage charges, which may be charged annually or in a lump sum up front. According to embodiments of the invention, if the recording user fails to pay a storage charge, another user, e.g., the recording user's family members, or the recipient of the particular recorded content may be notified that there is undelivered content associated with a non-paying user, and the other users may be prompted with an option to pay the storage charge until the delivery date. According to some embodiments of the invention, the server may obtain, e.g., upon registration, the recording user, and other users' telephone numbers, e.g., mobile phone numbers. A user may also indicate a preferred mode of telephone communication, e.g., voice message or SMS text. When a non-paying trigger is reached, e.g., a payment is 30 days overdue, the server may cause a communication, e.g., an automated voice message or SMS message, depending on the recording user's registered preference, to be delivered to the recording user's registered phone, notifying that recorded and undelivered content will be deleted if payment is not received. Such methods may also be used if an email address becomes obsolete, e.g., in the event of undeliverable mail to the registered email address. Other methods may be used to search for recipients in the event of non-payment, e.g., publication of advertisements in local newspapers listing owners of non-paying accounts with undelivered content, instructing interested recipients how to retrieve or re-activate such accounts.

According to some embodiments of the invention, content for which storage fees have not been paid may be deleted, or may become hidden from users for a grace period, e.g., one year, and may be retrieved upon payment of a retrieval fee.

According to embodiments of the invention, users may be given the option of downloading delivered content, or having the content burned onto a DVD, which may be provided at a fee.

The system of the present invention may be used for simple archiving of large content files. For such uses, users may be charged, for example, per gigabyte of storage space, for long-term archiving of videos that are sent and received if that storage is longer than the threshold period, e.g., one year. According to embodiments of the invention, if the recording user fails to pay a storage charge, another user, e.g., the recording user's family members, may be notified that there is archived content associated with a non-paying user, and the other users may be prompted with an option to pay the storage charge.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for future delivery of digital content items over a data network comprising:
    obtaining at a server over a data network at least one digital content item for future delivery and delivery metadata pertaining to future delivery of the digital content item, wherein said delivery metadata includes at least one recipient and a delivery date, wherein said delivery date is any one or more of a date selected from an absolute date, a relative date, or a date to be calculated based on data pertaining to said at least one recipient, and wherein the digital content item is a video content item, and wherein obtaining said digital content item comprises obtaining said digital content item over a data network from an originating client device by causing a camera and a microphone associated with said originating client device to capture said digital content item, wherein obtaining said digital content item comprises interacting with an application operating on said originating client device so as to cause the camera and microphone associated with said originating client device to capture said digital content item, and further to cause the originating client device to transmit said digital content item and said delivery metadata to said server;
    storing said captured digital content item on a storage medium associated with a server; and
    on the delivery date, delivering said digital content item to said at least one recipient.

2. The method of claim 1, further comprising indexing said digital content item based on said delivery metadata.

3. The method of claim 1, further comprising after obtaining said digital content item, allowing playback of the digital content item, and requesting approval of said digital content item prior to storing said digital content item.

4. The method of claim 1, wherein said delivery metadata includes a recipient group comprising a plurality of recipients.

5. The method of claim 1, wherein delivering said digital content item to said at least one recipient comprises:
    sending to said at least one recipient a delivery notification;
    allowing said at least one recipient to connect to said server over a data network; and
    delivering said digital content item to the at least one recipient over the data network.

6. A system for future delivery of digital content over a data network comprising:
    a server connected to a data network, said server capable of obtaining over said data network digital from a plurality of remote users a respective plurality of digital content items for future delivery and associated delivery metadata pertaining to future delivery of the digital content, wherein said delivery metadata for each digital content item includes at least one recipient and a delivery date, wherein said delivery date is any one or more of a date selected from an absolute date, a relative date, or a date to be calculated based on data pertaining to said at least one recipient, and wherein said digital content items are video content items, and wherein said server is capable of obtaining said digital content items over a data network from applications operating on said client devices associated with said remote users by causing cameras and microphones respectively associated with said client devices to capture said digital content items and further causing the originating client devices to transmit said digital content items and said delivery metadata to said server; and
    a storage medium associated with the server capable of storing the captured obtained digital content items;
    wherein said server is further capable of delivering said digital content items stored on said storage medium to said at least one recipient on said delivery date.

7. The system of claim 6, wherein said server is further capable of indexing said digital content items based on said respective delivery metadata.

8. The system of claim 6, wherein said server, after obtaining said digital content, is capable of allowing playback of the obtained digital content items over said data network, and requesting approval of said digital content items prior to storing said digital content items.

9. The system of claim 6, wherein said server is capable of delivering said digital content items to said at least one recipient by, for each of a plurality of digital content items:
    sending to said at least one recipient a delivery notification;
    allowing said at least one recipient to connect to said server over a data network; and
    delivering said digital content item to the at least one recipient over the data network.

10. A non-transitory computer-readable medium having stored thereon a set of computer readable instructions that when executed by a server cause the server to:
    obtain at said server over a data network at least one digital content item for future delivery and delivery metadata pertaining to future delivery of the digital content item, wherein said delivery metadata includes at least one recipient and a delivery date, wherein said delivery date is any one or more of a date selected from an absolute date, a relative date, or a date to be calculated based on data pertaining to said at least one recipient, and wherein said digital content item is a video content item, and wherein said computer readable instructions, when executed, further cause the server to obtain said digital content item by interacting with an application operating on said originating client device so as to cause a camera and a microphone associated with said originating client device to capture said digital content item, and further to cause the originating client device to transmit said digital content item and said delivery metadata to said server;

store said captured digital content item on a storage medium associated with a server; and on the delivery date, deliver said digital content item to said at least one recipient.

11. The non-transitory computer-readable medium of claim 10, wherein said computer readable instructions, when executed, further cause the server to index said digital content item based on said delivery metadata.

12. The non-transitory computer-readable medium of claim 10, wherein said computer readable instructions, when executed, further cause the server, after obtaining said digital content item, to allow playback of the digital content item, and request approval of said digital content item prior to storing said digital content item.

13. The non-transitory computer-readable medium of claim 10, wherein said computer readable instructions, when executed, further cause the server to deliver said digital content item to said at least one recipient by:

sending to said at least one recipient a delivery notification;

allowing said at least one recipient to connect to said server over a data network; and delivering said digital content item to the at least one recipient over the data network.

* * * * *